(12) United States Patent
Alam et al.

(10) Patent No.: US 12,008,157 B2
(45) Date of Patent: Jun. 11, 2024

(54) MOVEMENT DETECTION OF A HEAD MOUNTED DEVICE

(71) Applicant: QUALCOMM Incorporated, San Diego, CA (US)

(72) Inventors: Khurshid Syed Alam, Mountain View, CA (US); Russell Gruhlke, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/249,393

(22) Filed: Mar. 1, 2021

(65) Prior Publication Data

US 2022/0276702 A1 Sep. 1, 2022

(51) Int. Cl.
*G06F 3/01* (2006.01)
*F21V 8/00* (2006.01)
*G06T 7/246* (2017.01)

(52) U.S. Cl.
CPC ........... *G06F 3/013* (2013.01); *G02B 6/0068* (2013.01); *G06T 7/248* (2017.01); *G06T 2207/30201* (2013.01)

(58) Field of Classification Search
CPC ....... G06F 3/013; G02B 6/0068; G06T 7/248; G06T 2207/30201
See application file for complete search history.

(56) References Cited

U.S. PATENT DOCUMENTS

| | | | |
|---|---|---|---|
| 8,629,815 B2 | 1/2014 | Brin et al. | |
| 9,585,557 B1 | 3/2017 | Spivey | |
| 9,658,473 B2 * | 5/2017 | Lewis | A63F 13/5255 |
| 10,127,728 B2 | 11/2018 | Osman | |
| 10,613,333 B2 | 4/2020 | Yajima | |
| 11,195,495 B1 * | 12/2021 | Franklin | G02B 27/0093 |
| 11,215,848 B2 * | 1/2022 | Belli | A61B 5/0245 |
| 2010/0210926 A1 * | 8/2010 | Ciancitto | A61B 5/14552 600/310 |
| 2013/0021225 A1 * | 1/2013 | Braun | G02C 11/10 340/3.1 |
| 2013/0069787 A1 | 3/2013 | Petrou | |

(Continued)

FOREIGN PATENT DOCUMENTS

| | | |
|---|---|---|
| EP | 2886041 A1 | 6/2015 |
| WO | WO-2020018982 A1 | 1/2020 |
| WO | 2020222752 A1 | 11/2020 |

OTHER PUBLICATIONS

International Search Report and Written Opinion—PCT/US2022/070169—ISA/EPO—dated May 3, 2022.

*Primary Examiner* — Bryan Earles
(74) *Attorney, Agent, or Firm* — QUALCOMM Incorporated

(57) ABSTRACT

In some aspects, a head mounted device may include an eye portion configured to face an eye of a user wearing the head mounted device, where the eye portion includes a display. The head mounted device may include at least one light emitter configured to emit light for illuminating at least a portion of a nose of the user. The head mounted device may include at least one image sensor configured to capture an image of at least a portion of the nose of the user for use in determining a shift or a rotation of the head mounted device relative to the user. Numerous other aspects are provided.

30 Claims, 13 Drawing Sheets

(56) References Cited

U.S. PATENT DOCUMENTS

| | | | |
|---|---|---|---|
| 2013/0083003 A1* | 4/2013 | Perez | G06T 11/20 |
| | | | 345/419 |
| 2018/0092547 A1* | 4/2018 | Tzvieli | A61B 5/0935 |
| 2018/0096503 A1* | 4/2018 | Kaehler | G06V 40/166 |
| 2018/0096533 A1* | 4/2018 | Osman | G06T 17/10 |
| 2018/0348547 A1 | 12/2018 | Rousseau et al. | |
| 2019/0101977 A1* | 4/2019 | Armstrong-Muntner | |
| | | | G06F 3/011 |
| 2019/0101984 A1* | 4/2019 | Talati | G06N 20/00 |
| 2019/0227319 A1* | 7/2019 | Trail | G02B 27/0081 |
| 2019/0310369 A1* | 10/2019 | Appleby | G01S 17/04 |
| 2019/0361519 A1* | 11/2019 | Lee | G06F 3/012 |
| 2019/0387168 A1* | 12/2019 | Smith | H04N 5/23245 |
| 2020/0064635 A1* | 2/2020 | Franklin | G02B 27/0179 |
| 2020/0192105 A1* | 6/2020 | Sakatsume | H04N 5/64 |
| 2020/0314306 A1* | 10/2020 | Tokuse | G06F 3/013 |
| 2021/0318558 A1 | 10/2021 | Tzvieli et al. | |
| 2022/0083134 A1* | 3/2022 | Kassner | G06F 3/013 |
| 2022/0229490 A1* | 7/2022 | Koo | G02B 27/0093 |

* cited by examiner

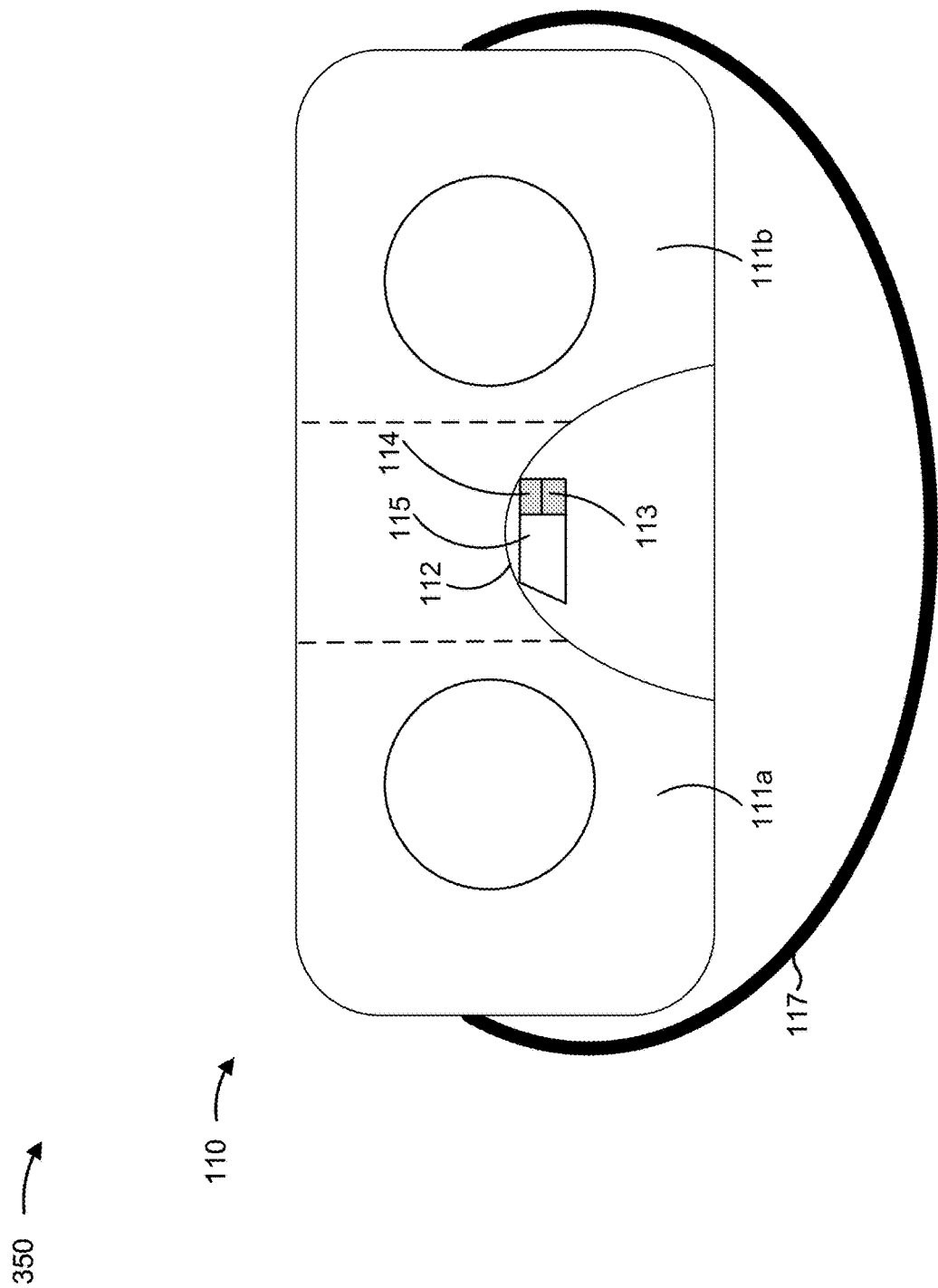

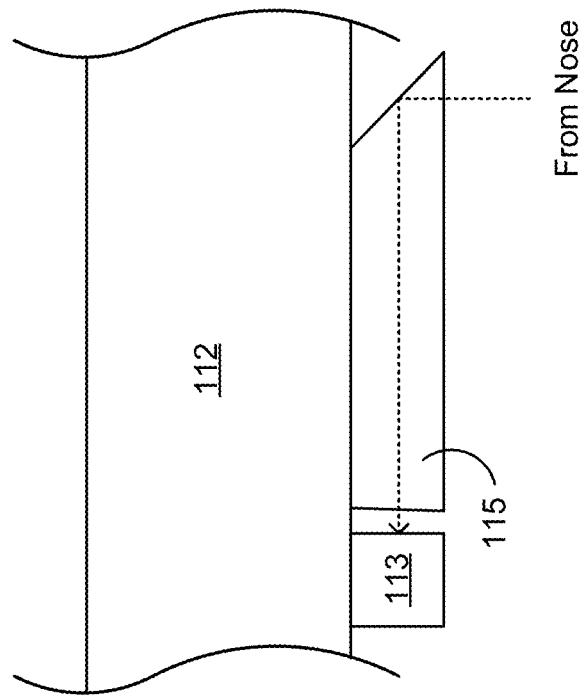
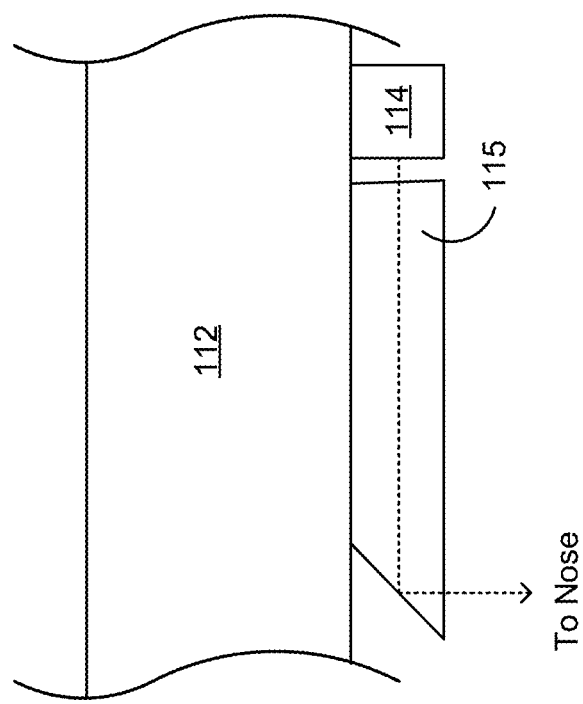
FIG. 4B

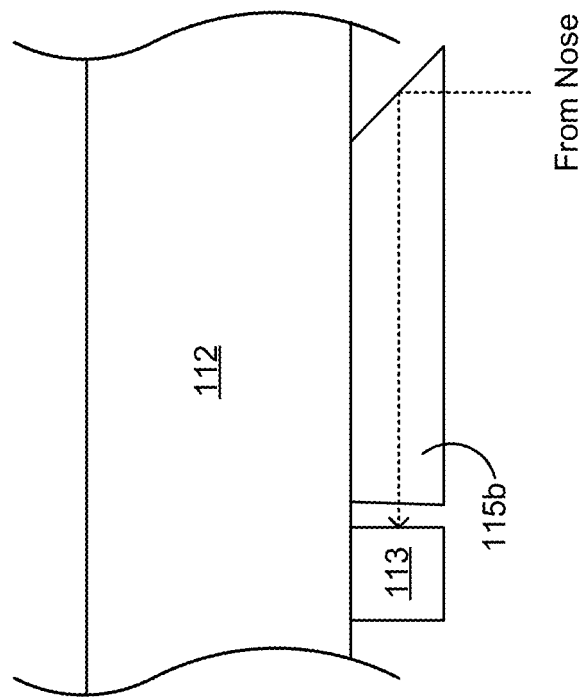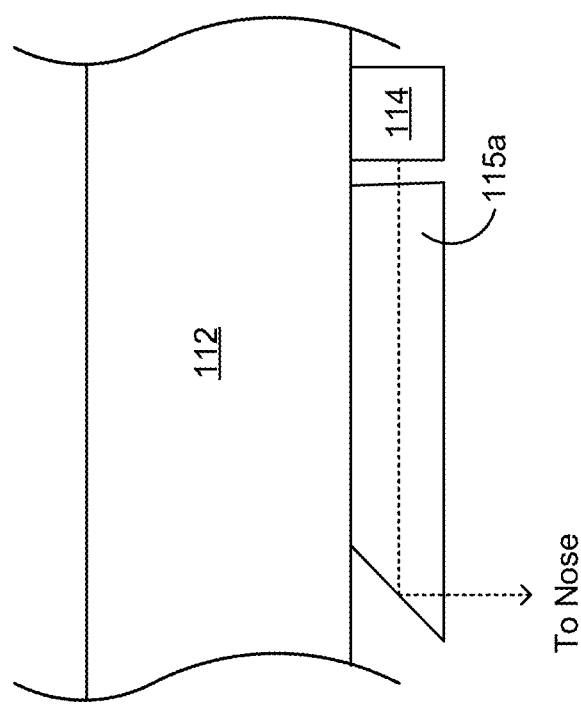
FIG. 5B

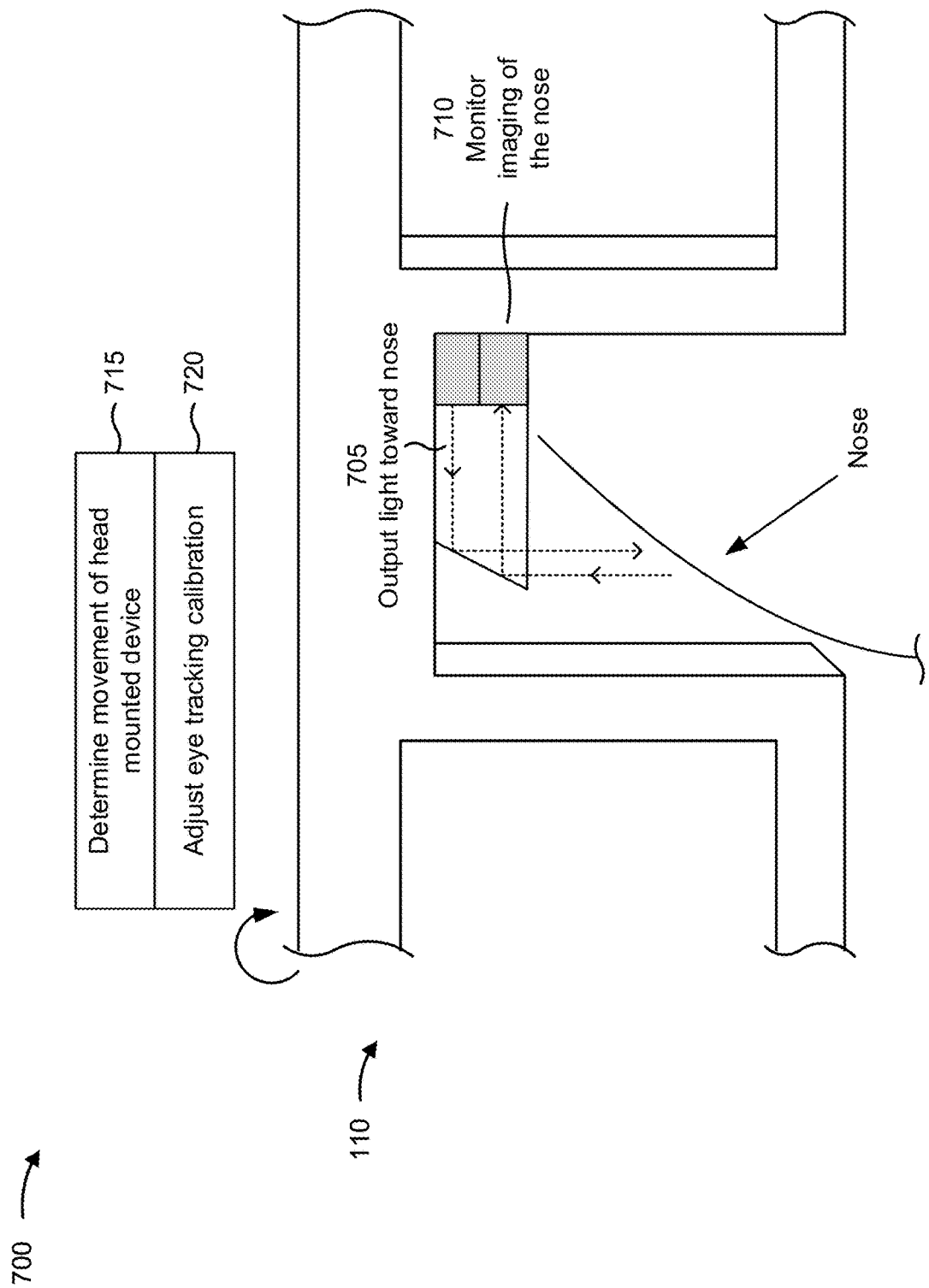

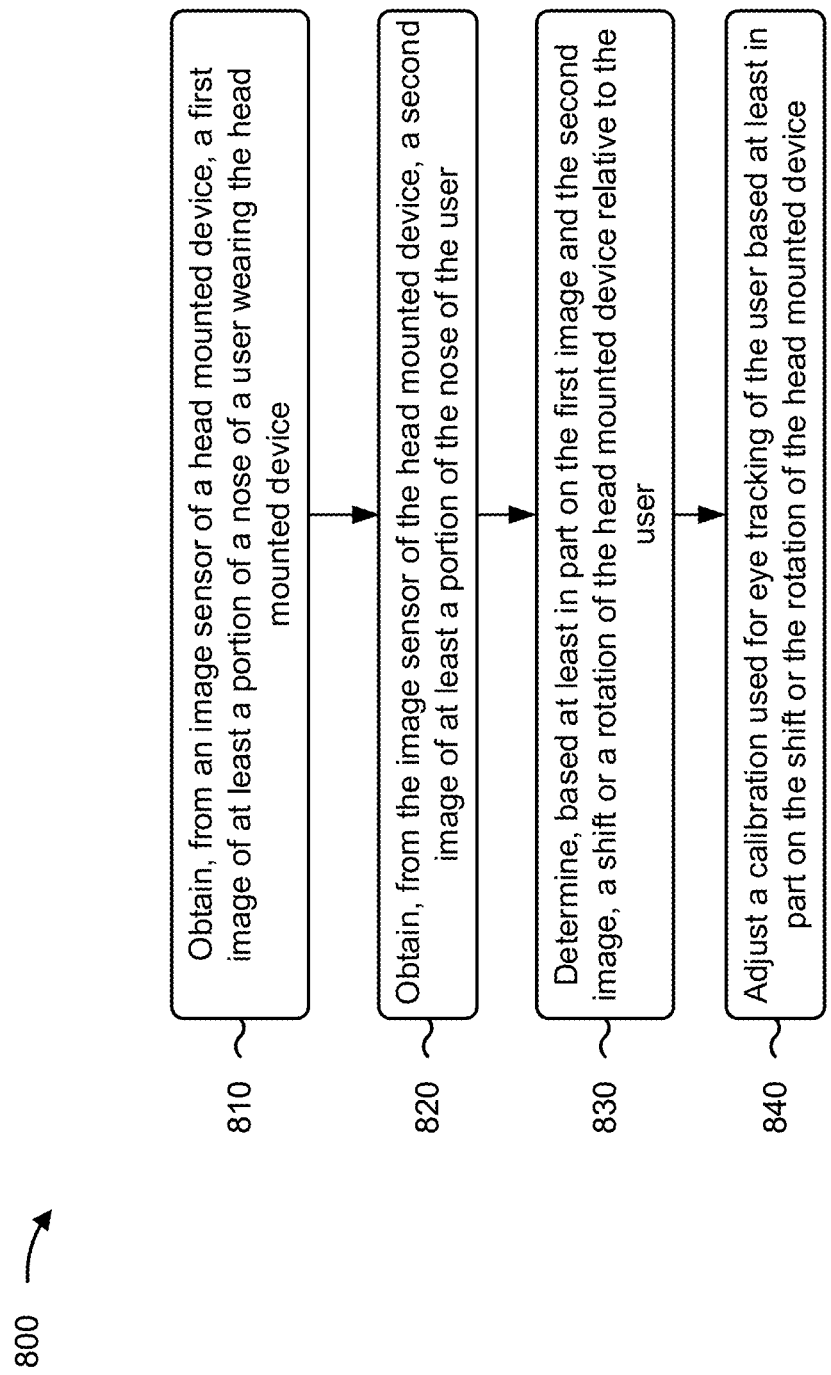

MOVEMENT DETECTION OF A HEAD MOUNTED DEVICE

FIELD OF THE DISCLOSURE

Aspects of the present disclosure generally relate to head mounted devices and, for example, to movement detection of a head mounted device.

BACKGROUND

A head mounted display is a display device that may be worn on the head of a user. A head mounted display may include a small display optic in front of one eye of a user (which may be referred to as a monocular head mounted display) or in front of each eye of the user (which may be referred to as a binocular head mounted display). A head mounted display may be used in connection with gaming, aviation, engineering, and/or medicine, among other examples. A virtual reality headset is an example of a head mounted display (e.g., a head mounted display that employs an inertial measurement unit). Another example of a head mounted display is an augmented reality head mounted display, which is a wearable display that can reflect projected images while allowing a user to see through the display.

SUMMARY

In some aspects, a head mounted device includes an eye portion configured to face an eye of a user wearing the head mounted device, wherein the eye portion includes a display; at least one light emitter configured to emit light for illuminating at least a portion of a nose of the user; and at least one image sensor configured to capture an image of at least a portion of the nose of the user for use in determining a shift or a rotation of the head mounted device relative to the user.

In some aspects, a system includes a light emitter configured to emit light for illuminating at least a portion of a nose of a user wearing a head mounted device; an image sensor configured to capture an image of at least a portion of the nose of the user; a memory; and one or more processors coupled to the memory, the memory and the one or more processors configured to: determine a shift or a rotation of the head mounted device relative to the user based at least in part on the image.

In some aspects, a method includes obtaining, from an image sensor of a head mounted device, a first image of at least a portion of a nose of a user wearing the head mounted device; obtaining, from the image sensor of the head mounted device, a second image of at least a portion of the nose of the user; determining, based at least in part on the first image and the second image, a shift or a rotation of the head mounted device relative to the user; and adjusting a calibration used for eye tracking of the user based at least in part on the shift or the rotation of the head mounted device.

In some aspects, a non-transitory computer-readable medium storing a set of instructions includes one or more instructions that, when executed by one or more processors of a head mounted device, cause the head mounted device to: monitor, using an image sensor, at least a portion of a nose of a user wearing the head mounted device; determine, based at least in part on monitoring the nose of the user, a shift or a rotation of the head mounted device relative to the user; and adjust a calibration used for eye tracking of the user based at least in part on the shift or the rotation of the head mounted device.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3B are diagrams of examples of head mounted devices, in accordance with the present disclosure.

FIGS. 4A-4B are diagrams of an example bridge portion of the head mounted device of FIG. 3A.

FIGS. 5A-5B are diagrams of an example bridge portion of the head mounted device of FIG. 3A.

FIG. 7 is a diagram illustrating an example associated with movement detection of a head mounted device, in accordance with the present disclosure.

FIGS. 8-9 are flowcharts of example processes associated with movement detection of a head mounted device, in accordance with the present disclosure.

DETAILED DESCRIPTION

Figure 1:
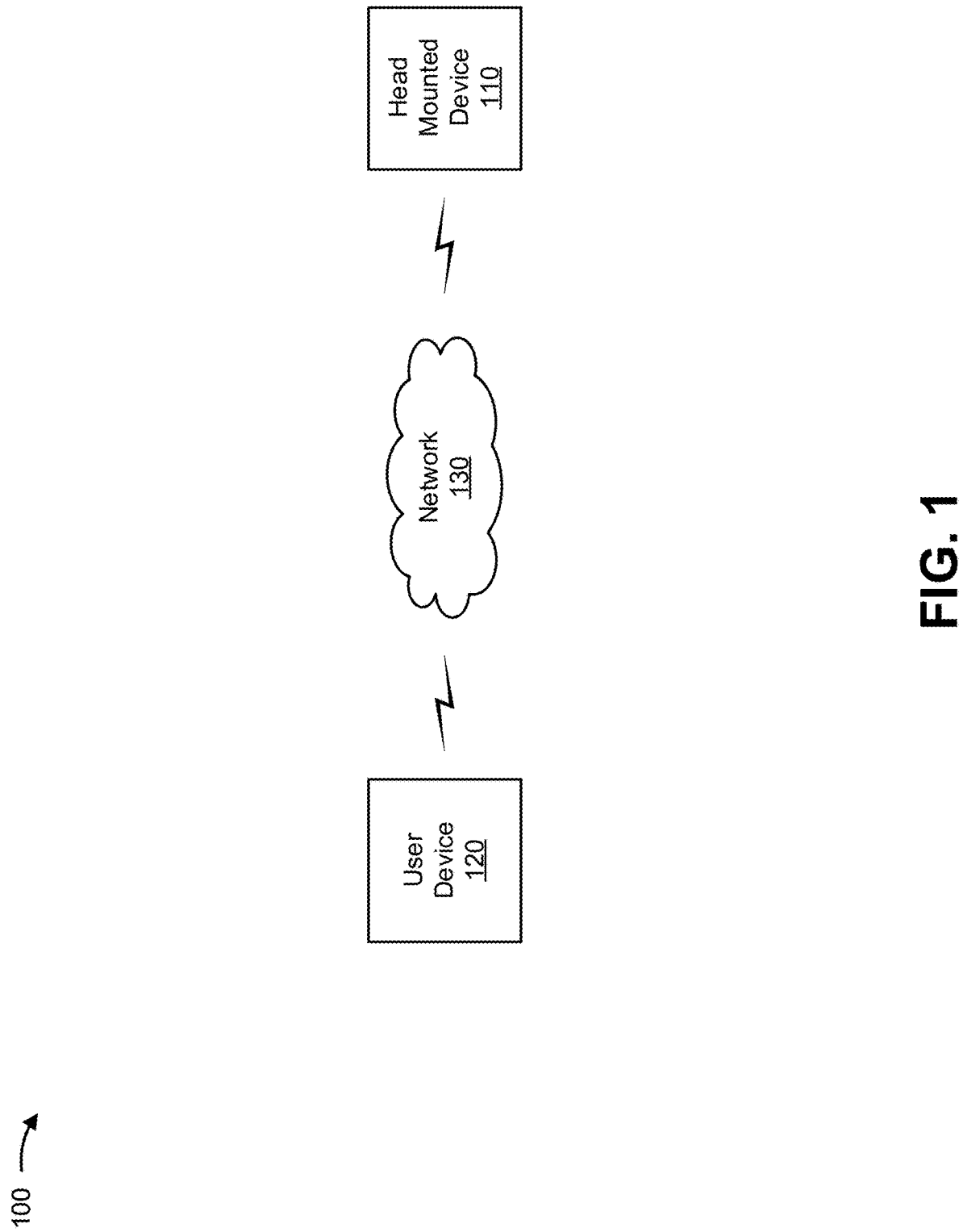
FIG. 1 is a diagram illustrating an example environment in which a head mounted device described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A head mounted device (e.g., a head mounted display device) may be used for augmented reality (AR) and/or virtual reality (VR) applications. In some examples, a head mounted device may include one or more eye-facing cameras for eye tracking of a user of the head mounted device. For example, eye tracking may be used to monitor a direction of a gaze of the user. Based on the direction of the user's gaze, the head mounted device may adjust a content of a display, adjust a scene that is displayed, display particular information, or the like.

In some cases, a head mounted device worn by a user may move (e.g., shift or rotate) relative to the user's eyes during use, thereby making eye tracking difficult. For example, continuous calibration of the eye tracking may be needed to compensate for the movement of the head mounted device. In some examples, optical glints from the user's eyes may be tracked in order to perform calibration of the eye tracking. However, such approaches are complex and consume significant power and processing resources.

Some techniques and apparatuses described herein provide for movement detection of a head mounted device, which may be useful for eye tracking. In some aspects, an image sensor (e.g., a camera) may be used to detect the movement (e.g., shift or rotation) of a head mounted device relative to a stationary portion of a user's face. For example, the stationary portion of a user's face may be the user's nose, and particularly, the bridge of the user's nose. In some aspects, an image sensor and/or a light emitter may be positioned at a bridge portion of the head mounted device (e.g., a portion between the left and right eye portions of the head mounted device, and that is in contact or near contact with the user's nose when the head mounted device is worn).

A form factor of the bridge portion may be relatively small, and therefore constrain possible locations for the image sensor and/or the light emitter. Moreover, the image sensor may need to be located a particular distance (which may be referred to as a throw distance) from the user's nose in order to obtain usable images. In some aspects, the head mounted device may include at least one light guide that is configured to direct light from the light emitter to the user's nose and/or direct light reflected from the user's nose to the image sensor. In this way, the light guide allows for a sufficient throw distance between the image sensor and the user's nose so that usable images can be obtained.

In some aspects, the image sensor may obtain images of the user's nose, which may depict features (e.g., skin features) on the user's nose. When the head mounted device moves during use, the movement may be determined based at least in part on the images. This may be accomplished by tracking pixel-by-pixel shifting of the features of the user's nose across the images. Moreover, a calibration used for eye tracking may be adjusted based at least in part on the movement that is determined. In this way, the techniques and apparatuses described herein facilitate efficient eye tracking that conserves power resources and processing resources.

FIG. 1 is a diagram of an example environment 100 in which systems and/or methods described herein may be implemented. As shown in FIG. 1, environment 100 may include a head mounted device 110, a user device 120, and a network 130. Devices of environment 100 may interconnect via wired connections, wireless connections, or a combination of wired and wireless connections.

The head mounted device 110 includes one or more devices capable of receiving, generating, storing, processing, and/or providing information associated with movement detection of the head mounted device 110, as described elsewhere herein. The head mounted device 110 may include a communication device and/or a computing device. For example, the head mounted device 110 may include a wearable communication device, such as a pair of smart eyeglasses, a head mounted display, a virtual reality headset, a goggle-type headset (e.g., a head mounted housing that surrounds one or more displays), a helmet, or a similar type of device. In some aspects, the head mounted device 110 may include one or more processors configured to determine movement of the head mounted device 110 based at least in part on images of a nose of a user, adjust a calibration used for eye tracking based at least in part on the determined movement, perform eye tracking based at least in part on the calibration, and/or adjust a content of a display based at least in part on the eye tracking, among other examples.

In some aspects, the head mounted device 110 may include one or more sensors. For example, the head mounted device 110 may include an image sensor configured to obtain images (e.g., based at least in part on reflected light incident on a receiver of the image sensor). As an example, the image sensor may include a camera. In some aspects, the image sensor may be a low-power image sensor (e.g., a power consumption of the image sensor is below a threshold value). In some aspects, the image sensor may include one or more processors configured to perform one or more operations described above as being performed by the head mounted device 110.

In some aspects, the head mounted device 110 may include one or more light emitters configured to emit light. For example, a light emitter may be configured to illuminate a scene in a field of view of the image sensor. In some aspects, a sensor (e.g., an image sensor) of the head mounted device 110 may include a light emitter. In some aspects, a light emitter may include a light emitting diode (LED) or another low-power light emitter (e.g., a power consumption of the light emitter is below a threshold value). In some aspects, a light emitter may be configured to output red light (e.g., light in a wavelength range of 620 nanometers to 750 nanometers). In some aspects, a light emitter may be configured to output near infrared light (e.g., light in a wavelength range of 750 nanometers to 1400 nanometers).

In some aspects, the head mounted device 110 may include one or more light guides configured to direct light. In some aspects, a light guide may be configured to direct light from a light emitter to a nose of a user. In some aspects, a light guide may be configured to direct light reflected from a nose of a user to an image sensor. In some aspects, a light guide may be composed of plastic or glass.

The user device 120 includes one or more devices capable of receiving, generating, storing, processing, and/or providing information associated with movement detection of the head mounted device 110, as described elsewhere herein. For example, the user device 120 may include one or more processors configured to perform one or more operations described above as being performed by the head mounted device 110. In some aspects, the user device 120 may obtain information (e.g., information relating to images obtained by the image sensor) from the head mounted device 110 in order to perform the one or more operations.

The user device 120 may include a communication device and/or a computing device. For example, the user device 120 may include a wireless communication device, a mobile phone, a user equipment, a laptop computer, a tablet computer, a desktop computer, a gaming console, a set-top box, a wearable communication device (e.g., a smart wristwatch), or a similar type of device.

The network 130 includes one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The quantity and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
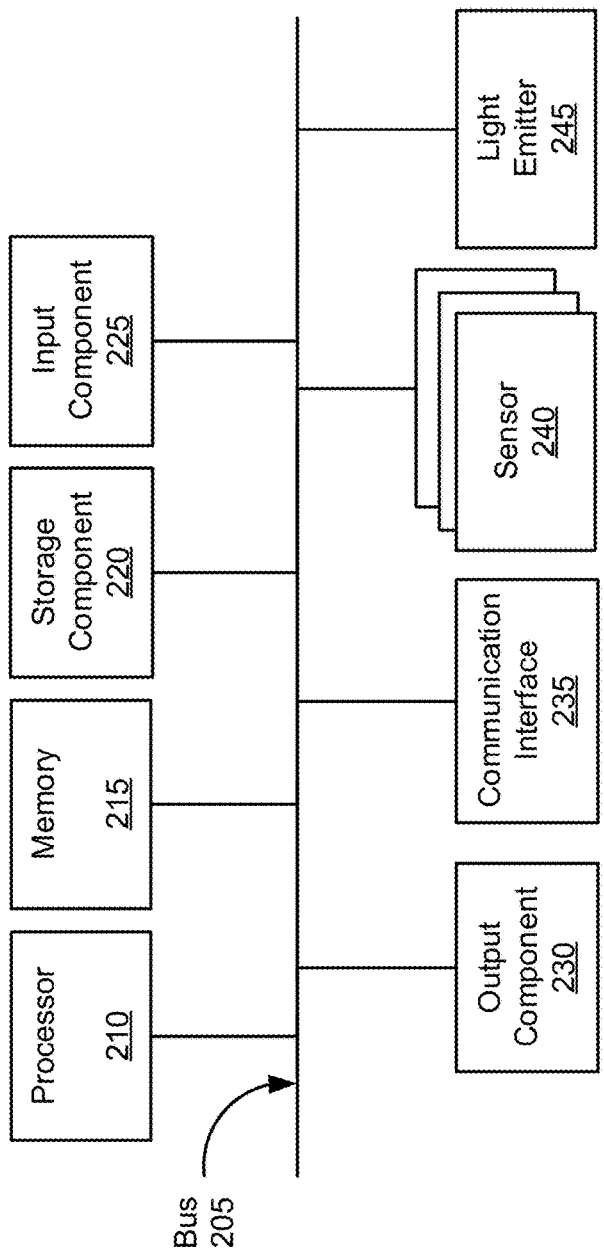
FIG. 2 is a diagram illustrating example components of one or more devices shown in FIG. 1, such as a head mounted device or a user device, in accordance with the present disclosure.

FIG. 2 is a diagram illustrating example components of a device 200, in accordance with the present disclosure. Device 200 may correspond to head mounted device 110 and/or user device 120. In some aspects, head mounted device 110 and/or user device 120 may include one or more devices 200 and/or one or more components of device 200. As shown in FIG. 2, device 200 may include a bus 205, a processor 210, a memory 215, a storage component 220, an input component 225, an output component 230, a communication interface 235, one or more sensors 240 (referred to individually as a "sensor 240" and collectively as "sensors 240"), and/or a light emitter 245.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include a vision sensor (e.g., an image sensor, an optical sensor, or the like) that has a field of view in which sensor 240 may determine one or more characteristics of an environment of device 200. In some aspects, sensor 240 may include a camera. For example, sensor 240 may include a low-resolution camera that is capable of capturing images that are less than one megapixel, images that are less than 1216×912 pixels, images that are less than or equal to 320×240 pixels, or the like. Sensor 240 may be a low-power device (e.g., a device that consumes less than 10 milliwatts (mW) of power or less than 3 mW of power) that has always-on capability while device 200 is powered on.

Additionally, or alternatively, sensor 240 may include a gyroscope (e.g., a micro-electro-mechanical systems (MEMS) gyroscope or a similar type of device), an accelerometer, a motion sensor, a light sensor, and/or an infrared sensor, among other examples.

Light emitter 245 includes a light emitting component that enables device 200 to emit light toward a face. For example, light emitter 245 may enable device 200 to emit light toward a nose to cause the light to be reflected toward sensor 240. Light emitter 245 may include an LED and/or a vertical-cavity surface emitting laser (VCSEL). In some aspects, light emitter 245 may include a red spectrum emitter and/or an infrared spectrum emitter. In some aspects, light emitter 245 may be associated with an output power that satisfies a threshold (e.g., a visibility threshold, a safety threshold, or the like).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for obtaining, from an image sensor of a head mounted device, a first image of at least a portion of a nose of a user wearing the head mounted device; means for obtaining, from the image sensor of the head mounted device, a second image of at least a portion of the nose of the user; means for determining, based at least in part on the first image and the second image, a shift or a rotation of the head mounted device relative to the user; means for adjusting a calibration used for eye tracking of the user based at least in part on the shift or the rotation of the head mounted device; or the like. Additionally, or alternatively, device 200 may include means for monitoring, using an image sensor, at least a portion of a nose of a user wearing a head mounted device; means for determining, based at least in part on monitoring the nose of the user, a shift or a rotation of the head mounted device relative to the user; means for adjusting a calibration used for eye tracking of the user based at least in part on the shift or the rotation of the head mounted device; or the like. In some aspects, such means may include one or more components of device 200 described in connection with FIG. 2, such as bus 205, processor 210, memory 215, storage component 220, input component 225, output component 230, communication interface 235, sensor 240, and/or light emitter 245.

The quantity and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3A:
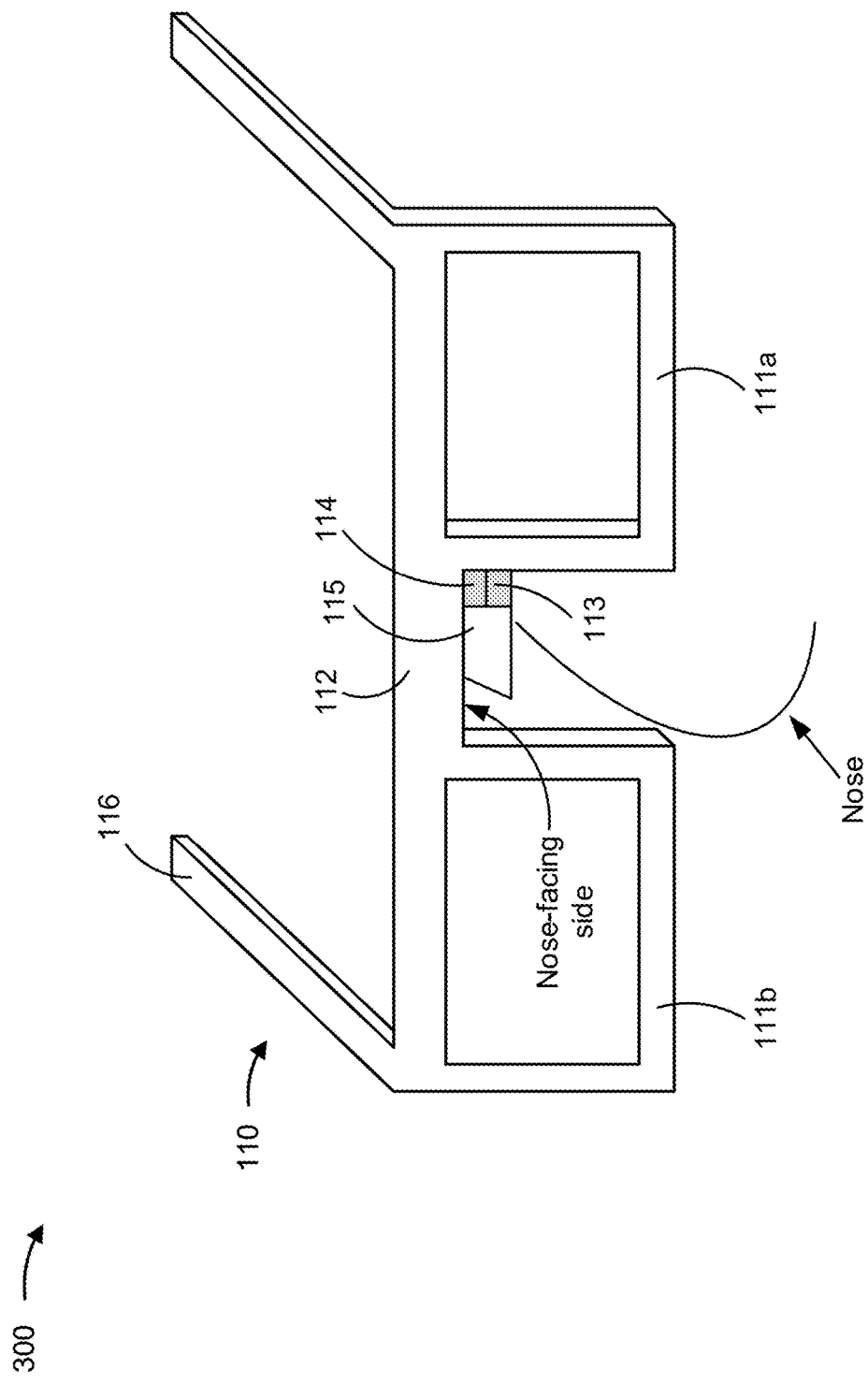

FIG. 3A is a diagram of an example 300 of head mounted device 110, in accordance with the present disclosure. The head mounted device 110 is described in more detail above in connection with FIG. 1 and FIG. 2. While the head mounted device 110 is shown in the form of eyeglasses (e.g., smart eyeglasses), in some aspects, the head mounted device 110 may be in the form of a headset (e.g., a VR headset), goggles, a helmet, or the like.

In some aspects, the head mounted device 110 includes at least one of a first eye portion 111a or a second eye portion 111b. The first eye portion 111a may be configured to face a first eye (e.g., a left eye) of a user wearing the head mounted device 110, and the second eye portion 111b may be configured to face a second eye (e.g., a right eye) of the user. In other words, when the head mounted device 110 is worn by the user, the first eye portion 111a is positioned in front of the first eye and the second eye portion 111b is positioned in front of the second eye. In some aspects, the head mounted device 110 may include a single eye portion.

In some aspects, at least one of the first eye portion 111a or the second eye portion 111b may include a display. In some aspects, the first eye portion 111a and/or the second eye portion 111b may include a see-through (e.g., transparent) display (e.g., for AR use). For example, a see-through display may include a lens, or another glass or plastic element through which the user can see. Moreover, the head mounted device 110 may include one or more projector elements configured to project one or more images (e.g., text, a picture, and/or a video) onto a see-through display.

In some aspects, the first eye portion 111a and/or the second eye portion 111b may include a display unit (e.g., for VR use). For example, a display unit may include a liquid-crystal display (LCD), a liquid crystal on silicon (LCos) display, and/or an organic light-emitting diode (OLED) display, among other examples.

In some aspects, the head mounted device 110 includes a bridge portion 112 (e.g., a nose bridge) between the first eye portion 111a and the second eye portion 111b. The bridge portion 112 may be configured to rest on the user's nose or nearby the user's nose. In other words, the bridge portion 112 may be adjacent to the user's nose (e.g., a bridge of the user's nose) when the head mounted device 110 is worn. The bridge portion 112 may be linear (as shown) or may be curved (e.g., to generally correspond to a contour of a nose's bridge). In some aspects, the bridge portion 112 may include a portion of an area (e.g., a recessed area) of the head mounted device 110 that is between the eye portions 111 and configured to receive a portion of the nose of the user. In some aspects, the head mounted device 110 may not include a bridge portion 112 (e.g., in connection with a helmet-style display device).

In some aspects, the head mounted device 110 includes at least one image sensor 113. The image sensor 113 may correspond to the image sensor described above in connection with FIGS. 1 and 2. For example, the image sensor 113 may include a camera, such as a low-resolution camera and/or a low-power camera. The image sensor 113 may be configured to capture an image of at least a portion of the nose of the user.

The image sensor 113 may be positioned at the bridge portion 112. For example, the image sensor 113 may be attached to a nose-facing side (e.g., a bottom side) of the bridge portion 112. As another example, the image sensor 113 may be embedded within the bridge portion 112 (e.g., such that at least a portion of the image sensor 113 is exposed at the nose-facing side of the bridge portion 112). In some aspects, the image sensor 113 may be positioned at a location of the head mounted device 110 other than the bridge portion 112 (or the head mounted device 110 may not include the bridge portion 112), and the image sensor 113 may be optically coupled to the nose of the user via a light guide, as described below.

In some aspects, the head mounted device 110 includes at least one light emitter 114. The light emitter 114 may correspond to the light emitter described above in connection with FIGS. 1 and 2. For example, the light emitter 114 may include an LED configured to output red light (e.g., light in a red wavelength) and/or near infrared light (e.g., light in a near infrared wavelength). Red light may be used for imaging dermal (e.g., surface) features of a nose, and near infrared light, which is capable of penetrating into the skin, may be used for imaging subdermal features (e.g., blood vessels) of a nose. The light emitter 114 may be configured to emit light for illuminating the nose of the user.

The light emitter 114 may be positioned at the bridge portion 112. For example, the light emitter 114 may be attached to a nose-facing side of the bridge portion 112. As another example, the light emitter 114 may be embedded within the bridge portion 112 (e.g., such that at least a portion of the light emitter 114 is exposed at the nose-facing side of the bridge portion 112). In some aspects, the light emitter 114 may be positioned at a location of the head mounted device 110 other than the bridge portion 112 (or the head mounted device 110 may not include the bridge portion 112), and the light emitter 114 may be optically coupled to the nose of the user via a light guide, as described below.

In some aspects, the head mounted device 110 includes at least one light guide 115. The light guide(s) 115 may correspond to the light guide described above in connection with FIG. 1. For example, the light guide(s) 115 may include an elongate element composed of clear glass or plastic. The light guide(s) 115 may be configured to provide optical communication between the nose of the user and at least one of the image sensor 113 or the light emitter 114. For example, a light guide 115 may be configured to direct (e.g., propagate) light from the light emitter 114, at a position away from the nose of the user, to the nose of the user. In some aspects, a light guide 115 may be configured to collect light that is scattered and reflected at the nose of the user, and direct the light from the nose of the user to the image sensor 113 at a position away from the nose of the user. In some aspects, the head mounted device 110 may include the image sensor 113 and the light emitter 114 and may not include a light guide 115. For example, the image sensor 113 may be configured to directly detect light reflected from the nose of the user and/or the light emitter 114 may be configured to directly illuminate at least a portion of the nose of the user.

In some aspects, a light guide 115 may include a cladding layer (e.g., of a relatively lower refractive index) that surrounds a core of the light guide 115 (e.g., of a relatively higher refractive index). In some aspects, a light guide 115 may include a beveled end. For example, the beveled end of the light guide 115 may be opposite an end of the light guide 115 that is optically coupled to the image sensor 113 and/or the light emitter 114 (e.g., the beveled end may be an end of the light guide 115 nearest to the user's nose). The beveled end may be configured to turn light at an angle of about 80 to 100 degrees, such as about 90 degrees. In some aspects, the beveled end may include a reflective coating (e.g., a mirror coating). Light propagating in the light guide 115 may undergo total internal reflection at the beveled end, such that the light is turned at an angle of about 90 degrees.

The light guide(s) 115 may be positioned at the bridge portion 112. The light guide(s) 115 may extend between the first eye portion 111a and the second eye portion 111b. For example, the light guide(s) 115 may extend in a direction from the first eye portion 111a to the second eye portion 111b. In some aspects, the light guide(s) 115 may extend in a direction from the image sensor 113, and/or from the light emitter 114, to the nose of the user. In some aspects, the light guide(s) 115 may extend along a nose-facing side of the bridge portion 112 (e.g., the light guide(s) 115 may be attached to the nose-facing side of the bridge portion 112). In some aspects, the light guide(s) 115 may be embedded within the bridge portion 112 (e.g., such that at least a portion of the light guide(s) 115 is exposed at the nose-facing side of the bridge portion 112). Accordingly, the light guide(s) 115 may be linear (e.g., if the bridge portion 112 is linear) or curved (e.g., if the bridge portion 112 is curved).

Thus, the light guide(s) 115 may extend parallel to, or follow a path of, the bridge portion 112. In this way, the light guide(s) 115 may be used to increase a distance between the image sensor 113 and a portion of the user's nose that is imaged. Accordingly, the image sensor 113 and the portion of the user's nose may be optically separated by a threshold distance (e.g., the throw distance of the image sensor) that enables proper imaging.

In some aspects, the head mounted device 110 may include one or more lenses in connection with the image sensor 113 and/or the light emitter 114. The head mounted device 110 may include a first lens (e.g., a collimating lens) in optical communication with the light emitter 114. In some aspects, the first lens may be integral to a light guide 115, or otherwise positioned between the user's nose and the light emitter 114. For example, light emitted from the light emitter 114 may pass through the first lens before reaching the user's nose. The head mounted device 110 may include a second lens (e.g., an imaging lens) in optical communication with the image sensor 113. In some aspects, the second lens may be integral to a light guide 115, or otherwise positioned between the user's nose and the image sensor 113. For example, light reflected from the user's nose may pass through the second lens before reaching the image sensor 113. In some aspects, the head mounted device 110 may include one or more optical fibers for propagating light from the light emitter 114 to the user's nose and/or light from the user's nose to the image sensor 113. For example, the head mounted device 110 may include a plurality of optical fibers that are optically coupled to respective pixels of the image sensor 113.

In some aspects, the head mounted device 110 includes one or two temple portions 116. A temple portion 116 may be configured to hold the head mounted device 110 to a head of the user (e.g., the temple portion 116 may be supported by an ear of the user). The temple portion 116 may be connected (e.g., fixedly or by a hinge) to a main portion of the head mounted device 110 that includes the first and second eye portions 111a, 111b and the bridge portion 112. In some aspects, one or more straps (not shown) may be connected to the main portion of the head mounted device 110 (e.g., in addition to or instead of the temple portions 116). The strap(s) may be configured to hold the head mounted device 110 to the head of the user.

As indicated above, FIG. 3A is provided as an example. Other examples may differ from what is described with regard to FIG. 3A. The quantity and arrangement of components shown in FIG. 3A is provided as an example. In practice, there may be additional components, fewer components, different components, or differently arranged components than those shown in FIG. 3A. Furthermore, two or more components shown in FIG. 3A may be implemented within a single component, or a single component shown in FIG. 3A may be implemented as multiple, distributed components. Additionally, or alternatively, a set of components (e.g., one or more components) shown in FIG. 3A may perform one or more functions described as being performed by another set of components shown in FIG. 3A.

FIG. 3B is a diagram of an example 350 of head mounted device 110, in accordance with the present disclosure. In FIG. 3B, the head mounted device 110 is shown in the form of a headset (e.g., a goggle-type headset).

In some aspects, the head mounted device 110 may include at least one of a first eye portion 111a or a second eye portion 111b, in a similar manner as described above. For example, the first eye portion 111a and/or the second eye portion 111b may include a display unit. In some aspects, the head mounted device 110 may include a bridge portion 112 (e.g., a nose bridge) between the first eye portion 111a and the second eye portion 111b, in a similar manner as described above. For example, the bridge portion 112 may include a portion of an area (e.g., a recessed area configured to receive a portion of the nose of the user) of the head mounted device 110 that is between the eye portions 111 and adjacent the user's nose bridge when the head mounted device 110 is worn. In some aspects, the head mounted device 110 may include at least one image sensor 113, at least one light emitter 114, and/or at least one light guide 115, in a similar manner as described above. In some aspects, the head mounted device 110 may include a strap 117 configured to hold the head mounted device 110 to the head of the user.

As indicated above, FIG. 3B is provided as an example. Other examples may differ from what is described with regard to FIG. 3B. The quantity and arrangement of components shown in FIG. 3B is provided as an example. In practice, there may be additional components, fewer components, different components, or differently arranged components than those shown in FIG. 3B. Furthermore, two or more components shown in FIG. 3B may be implemented within a single component, or a single component shown in FIG. 3B may be implemented as multiple, distributed components. Additionally, or alternatively, a set of components (e.g., one or more components) shown in FIG. 3B may perform one or more functions described as being performed by another set of components shown in FIG. 3B.

Figure 4A:
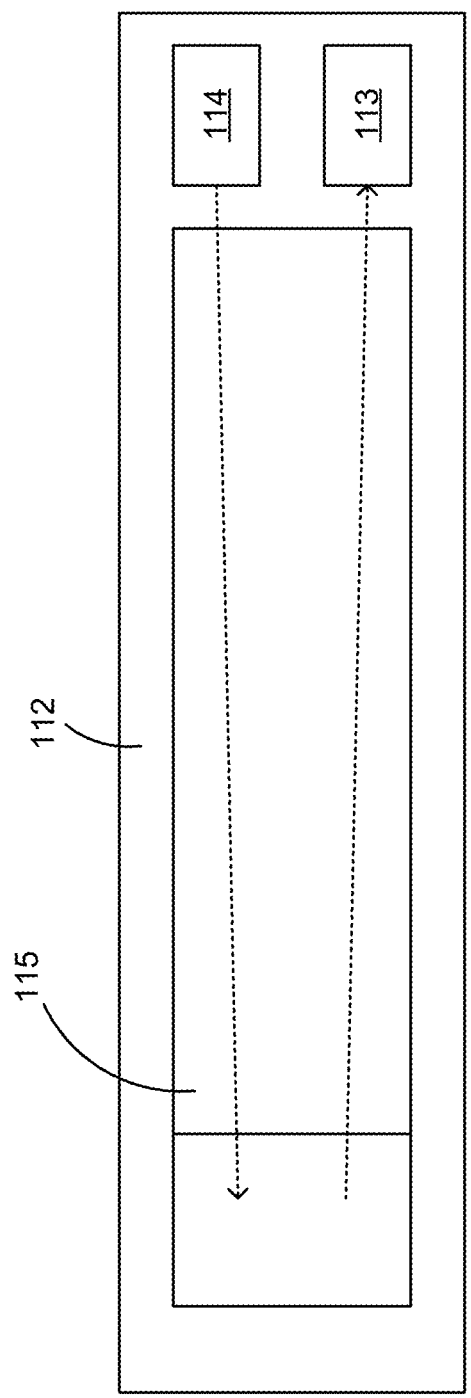

FIGS. 4A-4B are diagrams of an example bridge portion 112 of the head mounted device 110 of FIG. 3A. FIG. 4A shows a bottom view of the bridge portion 112 (i.e., a view of the nose-facing side of the bridge portion 112). FIG. 4B, at the left side, shows a front view of the bridge portion 112, and at the right side, shows a back view of the bridge portion 112.

As shown in FIG. 4A, in some aspects, the head mounted device 110 may include a single light guide 115 at the bridge portion 112. The light guide 115 may be optically coupled to the image sensor 113 and the light emitter 114. For example, the image sensor 113 and the light emitter 114 may be in optical communication with a first end of the light guide 115 (e.g., the image sensor 113 and the light emitter 114 are positioned adjacent the first end), and a second end of the light guide 115 may be configured for optical communication with the nose of the user (e.g., the second end may be in contact or near-contact with the nose of the user). As shown in FIG. 4B, at the left side, the light guide 115 may be configured to direct light from the light emitter 114 to the nose of the user. As shown in FIG. 4B, at the right side, the light guide 115 may be configured to direct light reflected from the nose of the user to the image sensor 113.

As indicated above, FIGS. 4A-4B are provided as an example. Other examples may differ from what is described with regard to FIGS. 4A-4B.

Figure 5A:
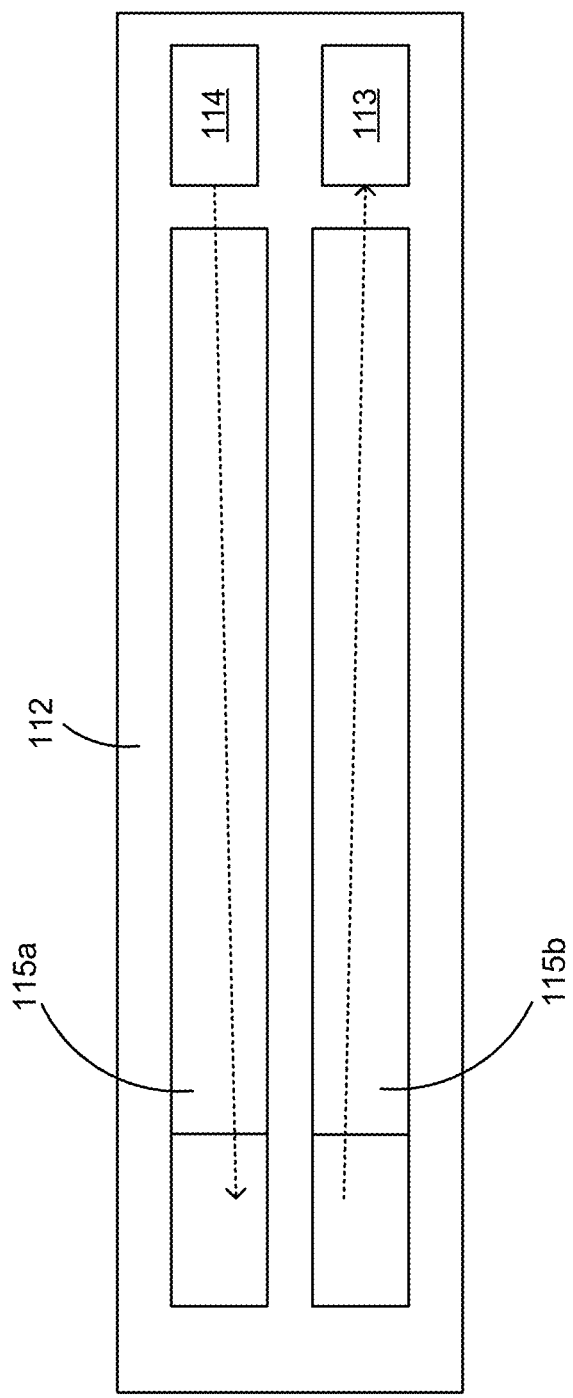

FIGS. 5A-5B are diagrams of an example bridge portion 112 of the head mounted device 110 of FIG. 3A. FIG. 5A shows a bottom view of the bridge portion 112 (i.e., a view of the nose-facing side of the bridge portion 112). FIG. 5B, at the left side, shows a front view of the bridge portion 112, and at the right side, shows a back view of the bridge portion 112.

As shown in FIG. 5A, in some aspects, the head mounted device 110 may include multiple (e.g., two) light guides 115a, 115b at the bridge portion 112. A first light guide 115a may be optically coupled to the light emitter 114, and a second light guide 115b may be optically coupled to the image sensor 113. For example, the light emitter 114 may be in optical communication with a first end of the first light guide 115a (e.g., the light emitter 114 may be positioned adjacent the first end of the first light guide 115a), and the image sensor 113 may be in optical communication with a first end of the second light guide 115b (e.g., the image sensor 113 may be positioned adjacent the first end of the second light guide 115b). Here, a second end of the first light guide 115a, and a second end of the second light guide 115b, are configured for optical communication with the nose of the user (e.g., the second ends may be in contact or near-contact with the nose of the user). As shown in FIG. 5B, at the left side, the first light guide 115a may be configured to direct light from the light emitter 114 to the nose of the user. As shown in FIG. 4B, at the right side, the second light guide 115b may be configured to direct light reflected from the nose of the user to the image sensor 113. The use of separate light guides 115a, 115b for the image sensor 113 and the light emitter 114 may reduce back reflections of the light emitter 114 that are detected at the image sensor 113.

As indicated above, FIGS. 5A-5B are provided as an example. Other examples may differ from what is described with regard to FIGS. 5A-5B.

Figure 6A:
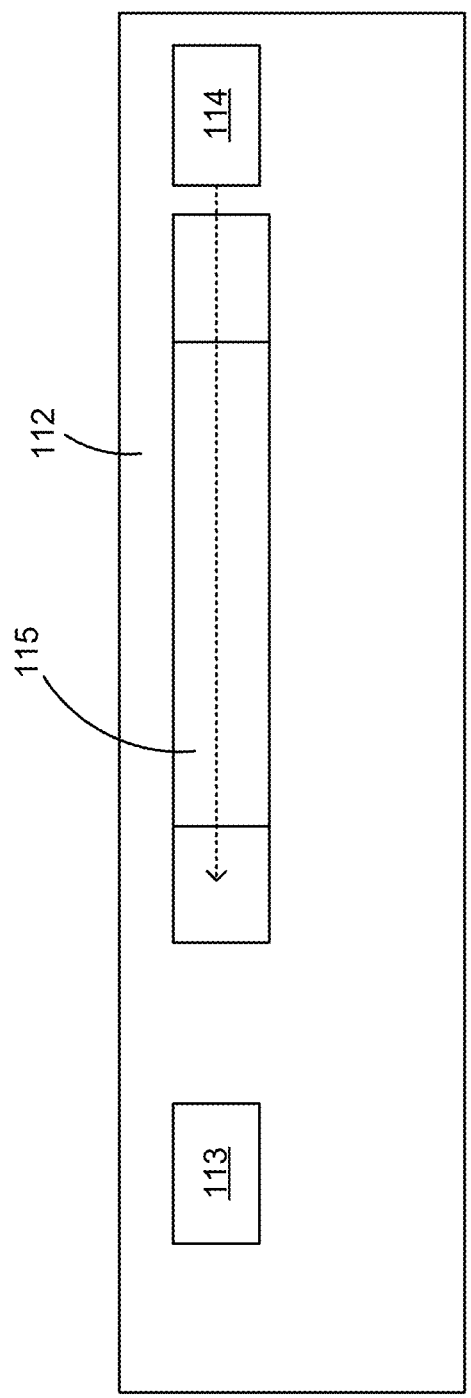
FIGS. 6A-6B are diagrams of an example bridge portion of the head mounted device of FIG. 3A.
Figure 6B:
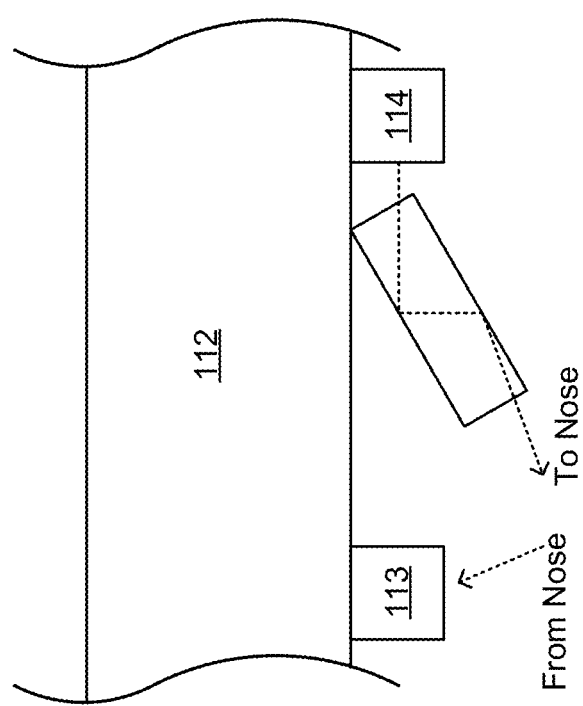

FIGS. 6A-6B are diagrams of an example bridge portion 112 of the head mounted device 110 of FIG. 3A. FIG. 6A shows a bottom view of the bridge portion 112 (i.e., a view of the nose-facing side of the bridge portion 112). FIG. 6B shows a front view of the bridge portion 112.

As shown in FIG. 6A, in some aspects, the head mounted device 110 may include a single light guide 115 at the bridge portion 112. The light guide 115 may be optically coupled to the light emitter 114 (and not optically coupled to the image sensor 113). For example, the light emitter 114 may be in optical communication with a first end of the light guide 115 (e.g., the light emitter 114 may be positioned adjacent the first end), and a second end of the light guide 115 may be configured for optical communication with the nose of the user (e.g., the second end may be in contact or near-contact with the nose of the user). As shown in FIG. 6B, the light guide 115 may be configured to direct light from the light emitter 114 to the nose of the user. The image sensor 113 may be configured to directly (e.g., without the light guide 115) detect light reflected from the nose of the user (e.g., the image sensor 113 may be configured for direct optical communication with the nose of the user). For example, if the bridge portion 112 is relatively thick, the image sensor 113 may be embedded deep within the bridge portion 112 to provide a sufficient throw distance without the need of a light guide for the image sensor 113. In some aspects, the image sensor 113 may be positioned nearer to the second end of the light guide 115 than the first end of the light guide 115.

As indicated above, FIGS. 6A-6B are provided as an example. Other examples may differ from what is described with regard to FIGS. 6A-6B.

FIG. 7 is a diagram of an example 700 associated with movement detection of a head mounted device, in accordance with the present disclosure. As shown in FIG. 7, example 700 includes the head mounted device 110, which is described in more detail above. In some aspects, the head mounted device 110 may be worn on a head of a user, such that the eye portions 111a, 111b are positioned in front of respective eyes of the user and the bridge portion 112 is positioned adjacent a nose of the user. The user may wear the head mounted device 110 for use in connection with gaming, aviation, engineering, and/or medicine, among other examples.

As shown by reference number 705, the head mounted device 110 may output light (e.g., using the light emitter 114) toward the nose of the user. For example, the head mounted device 110 may output light toward a bridge of the user's nose. The light may provide illumination of at least a portion of the nose to facilitate imaging of the nose. In some aspects, a processor of the head mounted device 110 may cause the head mounted device 110 to output the light upon powering on of the head mounted device 110. Moreover, the head mounted device 110 may continually output the light while powered on.

As shown by reference number 710, the head mounted device 110 may monitor (e.g., using the image sensor 113) imaging of the user's nose. For example, the head mounted device 110 may obtain (e.g., using the image sensor 113) images of the user's nose (e.g., based at least in part on illumination of the user's nose). The head mounted device 110 may obtain the images continuously (e.g., according to a frame rate of the image sensor 113) or at regular or irregular intervals. In some aspects, the head mounted device 110 may obtain (e.g., from the image sensor 113) a first image of the user's nose and a second image of the user's nose. The first image may be obtained at an earlier time from a time at which the second image is obtained.

In some aspects, a processor of the head mounted device 110 may cause the head mounted device 110 to monitor imaging of the user's nose upon powering on of the head mounted device 110. Moreover, the head mounted device 110 may continually monitor imaging of the user's nose while powered on.

The images of the user's nose obtained by the head mounted device 110 may depict at least a portion of the user's nose. For example, the images may depict a portion of the user's nose that is illuminated, as described above. As an example, the images may depict a bridge of the user's nose. The images of the user's nose may depict one or more nasal features. The nasal features may include dermal features (e.g., wrinkles, freckles, hairs, or the like) and/or subdermal features (e.g., blood vessels, or the like).

As shown by reference number 715, the head mounted device 110 may determine (e.g., using one or more processors) a movement of the head mounted device 110 based at least in part on monitoring the imaging of the user's nose. That is, the head mounted device 110 may determine a movement of the head mounted device 110 based at least in part on the imaging of the user's nose obtained by the head mounted device 110. The movement of the head mounted device 110 may include a shift and/or a rotation of the head mounted device 110. The shift or the rotation of the head mounted device 110 may be relative to the user (e.g., one or more eyes of the user, the nose of the user, and/or the head of the user). Thus, the shift or the rotation may affect eye tracking that is being performed for the user.

In some aspects, the head mounted device 110 may determine the movement of the head mounted device 110 by tracking a shift of one or more nasal features in the imaging obtained by the head mounted device 110 (e.g., in a similar manner in which an optical mouse tracks pixel-by-pixel shifting of a surface feature image across a camera sensor of the optical mouse). For example, the head mounted device 110 may determine a shift of one or more pixels in the images of the user's nose (e.g., by determining that a particular value, such as a color value, associated with a first pixel has shifted to an adjacent second pixel). As an example, the head mounted device 110 may determine a shift of one or more pixels in the second image obtained by the head mounted device 110 relative to the first image obtained by the head mounted device 110. In this way, the head mounted device 110 may determine pixel-by-pixel shifting of imaged nose features across the image sensor 113 to thereby determine the movement of the head mounted device 110. In some aspects, the head mounted device 110 may employ a computer vision technique and/or machine learning to identify features in the images, track the shifting of the features in the images, or the like.

As shown by reference number 720, the head mounted device 110 may adjust (e.g., using one or more processors) a calibration used for eye tracking. The calibration may identify a magnitude (e.g., in pixels) and/or a direction by which eye tracking is to be offset in order to compensate for the movement of the head mounted device 110. The adjustment to the calibration may correspond to the shifting of the nasal features in the imaging. For example, a particular amount of pixels by which a nasal feature shifts in the imaging, and/or a particular direction in which a nasal feature shifts in the imaging, may correspond to a particular adjustment that is to be used for eye tracking. The head mounted device 110 may determine the particular adjustment for eye tracking, that is to be used in response to a particular shift in the imaging, using one or more rules, algorithms, or the like.

In some aspects, the head mounted device 110 may perform eye tracking of the user based at least in part on the adjusted calibration. The head mounted device 110 may perform the eye tracking using one or more eye-facing image sensors (e.g., cameras). For example, the first eye portion 111a and/or the second eye portion 111b, described above, may include an image sensor for use in eye tracking. By performing eye tracking of the user, the head mounted device 110 may determine a direction of a gaze of the user.

In some aspects, the head mounted device 110 may adjust (e.g., using one or more processors) a content of a display of the head mounted device 110 based at least in part on the eye tracking of the user (e.g., based at least in part on the direction of the gaze of the user). For example, the head mounted device 110 may change an image that is displayed by the head mounted device 110, adjust an image that is displayed by the head mounted device, display particular information, or the like.

In this way, the head mounted device 110 may use a low-power camera and uncomplicated processing to detect movement of the head mounted device 110 and adjust eye tracking accordingly. Thus, the head mounted device 110 may perform eye tracking in a manner that conserves power resources and/or processing resources of the head mounted device 110.

As indicated above, FIG. 7 is provided as an example. Other examples may differ from what is described with regard to FIG. 7. For example, in some aspects, one or more operations described above as being performed by the head mounted device 110 may be performed by another device. For example, one or more of the operations may be performed by a user device (e.g., user device 120) that is in communication with the head mounted device 110.

FIG. 8 is a flowchart of an example process 800 associated with movement detection of a head mounted device. In some implementations, one or more process blocks of FIG. 8 may be performed by a head mounted device (e.g., head mounted device 110). In some implementations, one or more process blocks of FIG. 8 may be performed by another device or a group of devices separate from or including the head mounted device, such as a user device (e.g., user device 120). Additionally, or alternatively, one or more process blocks of FIG. 8 may be performed by one or more components of device 200, such as processor 210, memory 215, storage component 220, input component 225, output component 230, communication interface 235, image sensor 240, and/or light emitter 245.

As shown in FIG. 8, process 800 may include obtaining, from an image sensor of a head mounted device, a first image of at least a portion of a nose of a user wearing the head mounted device (block 810). For example, the head mounted device may obtain, from an image sensor of the head mounted device, a first image of at least a portion of a nose of a user wearing the head mounted device, as described above.

As further shown in FIG. 8, process 800 may include obtaining, from the image sensor of the head mounted device, a second image of at least a portion of the nose of the user (block 820). For example, the head mounted device may obtain, from the image sensor of the head mounted device, a second image of at least a portion of the nose of the user, as described above.

As further shown in FIG. 8, process 800 may include determining, based at least in part on the first image and the second image, a shift or a rotation of the head mounted device relative to the user (block 830). For example, the head mounted device may determine, based at least in part on the first image and the second image, a shift or a rotation of the head mounted device relative to the user, as described above.

As further shown in FIG. 8, process 800 may include adjusting a calibration used for eye tracking of the user based at least in part on the shift or the rotation of the head mounted device (block 840). For example, the head mounted device may adjust a calibration used for eye tracking of the user based at least in part on the shift or the rotation of the head mounted device, as described above.

Process 800 may include additional implementations, such as any single implementation or any combination of implementations described below and/or in connection with one or more other processes described elsewhere herein.

In a first implementation, determining the shift or the rotation of the head mounted device includes determining a shift of one or more pixels in the second image relative to the first image.

In a second implementation, alone or in combination with the first implementation, the one or more pixels depict at least one of dermal features of the nose or subdermal features of the nose.

In a third implementation, alone or in combination with one or more of the first and second implementations, process 800 includes performing eye tracking of the user based at least in part on the adjusted calibration, and adjusting a content of a display of the head mounted device based at least in part on performing eye tracking.

In a fourth implementation, alone or in combination with one or more of the first through third implementations, the first image and the second image are obtained by the image sensor based at least in part on an illumination of at least a portion of the nose of the user by a light emitter.

In a fifth implementation, alone or in combination with one or more of the first through fourth implementations, the shift or the rotation of the head mounted device is relative to the nose of the user.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
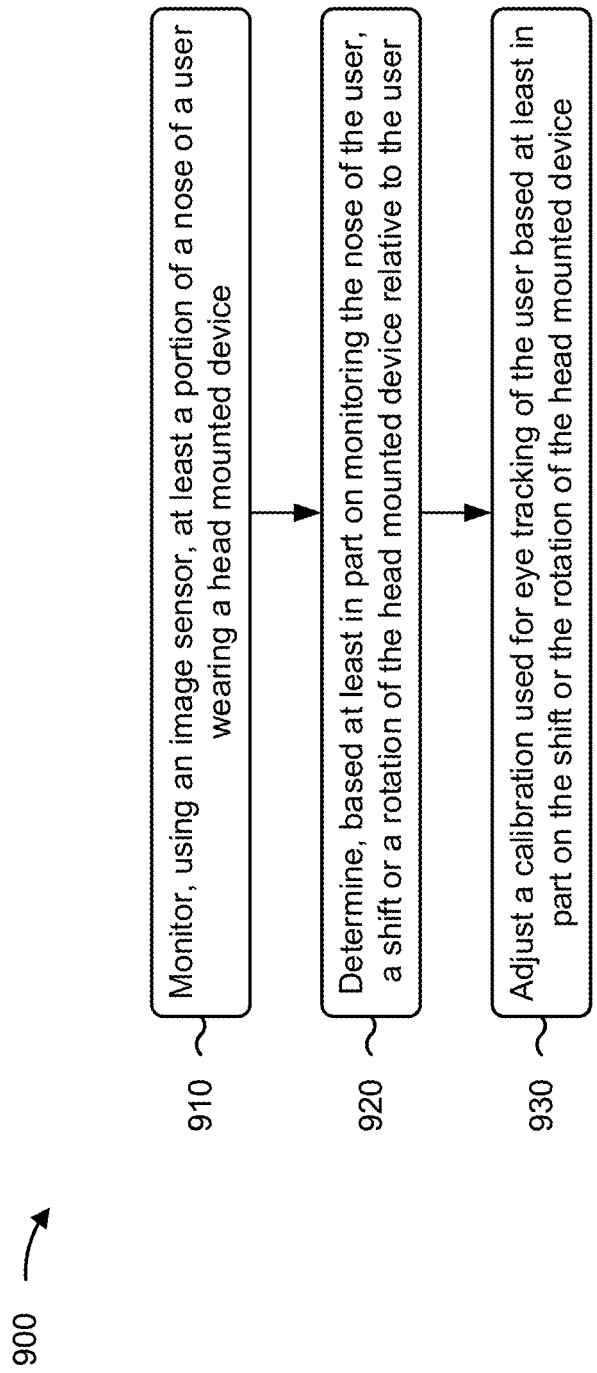

FIG. 9 is a flowchart of an example process 900 associated with movement detection of a head mounted device. In some implementations, one or more process blocks of FIG. 9 may be performed by a head mounted device (e.g., head mounted device 110). In some implementations, one or more process blocks of FIG. 9 may be performed by another device or a group of devices separate from or including the head mounted device, such as a user device (e.g., user device 120). Additionally, or alternatively, one or more process blocks of FIG. 9 may be performed by one or more components of device 200, such as processor 210, memory 215, storage component 220, input component 225, output component 230, communication interface 235, image sensor 240, and/or light emitter 245.

As shown in FIG. 9, process 900 may include monitoring, using an image sensor, at least a portion of a nose of a user wearing a head mounted device (block 910). For example, the head mounted device may monitor, using an image sensor, at least a portion of a nose of a user wearing the head mounted device, as described above.

As further shown in FIG. 9, process 900 may include determining, based at least in part on monitoring the nose of the user, a shift or a rotation of the head mounted device relative to the user (block 920). For example, the head mounted device may determine, based at least in part on monitoring the nose of the user, a shift or a rotation of the head mounted device relative to the user, as described above.

As further shown in FIG. 9, process 900 may include adjusting a calibration used for eye tracking of the user based at least in part on the shift or the rotation of the head mounted device (block 930). For example, the head mounted device may adjust a calibration used for eye tracking of the user based at least in part on the shift or the rotation of the head mounted device, as described above.

Process 900 may include additional implementations, such as any single implementation or any combination of implementations described below and/or in connection with one or more other processes described elsewhere herein.

In a first implementation, process 900 includes outputting light, from a light emitter, toward the nose of the user.

In a second implementation, alone or in combination with the first implementation, process 900 includes obtaining images of at least a portion of the nose of the user using the image sensor.

In a third implementation, alone or in combination with one or more of the first and second implementations, process 900 includes determining a shift of one or more pixels in images of at least a portion of the nose of the user obtained by the image sensor.

In a fourth implementation, alone or in combination with one or more of the first through third implementations, process 900 includes performing eye tracking of the user based at least in part on the adjusted calibration.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some aspects of the present disclosure:

Aspect 1: A head mounted device, comprising: an eye portion configured to face an eye of a user wearing the head mounted device, wherein the eye portion includes a display; at least one light emitter configured to emit light for illuminating at least a portion of a nose of the user; and at least one image sensor configured to capture an image of at least a portion of the nose of the user for use in determining a shift or a rotation of the head mounted device relative to the user.

Aspect 2: The head mounted device of aspect 1, further comprising: a light guide optically coupled to the at least one light emitter and configured to direct light from the at least one light emitter, at a position away from the portion of the nose, to the portion of the nose.

Aspect 3: The head mounted device of any of aspects 1-2, further comprising: a light guide optically coupled to the at least one image sensor and configured to direct light from the portion of the nose to the at least one image sensor at a position away from the portion of the nose.

Aspect 4: The head mounted device of any of aspects 1-3, wherein the eye portion is a first eye portion configured to face a first eye of the user, and wherein the head mounted device further comprises: a second eye portion configured to face a second eye of the user; and a bridge portion between the first eye portion and the second eye portion.

Aspect 5: The head mounted device of aspect 4, further comprising: a light guide at the bridge portion.

Aspect 6: The head mounted device of aspect 5, wherein the at least one light emitter and the at least one image sensor are in optical communication with a first end of the light guide, and wherein a second end of the light guide is configured for optical communication with the nose of the user.

Aspect 7: The head mounted device of aspect 5, wherein the at least one light emitter is in optical communication with a first end of the light guide, wherein a second end of the light guide is configured for optical communication with the nose of the user, and wherein the at least one image sensor is configured for direct optical communication with the nose of the user.

Aspect 8: The head mounted device of aspect 4, further comprising: a first light guide at the bridge portion; and a second light guide at the bridge portion.

Aspect 9: The head mounted device of aspect 8, wherein the at least one light emitter is in optical communication with a first end of the first light guide, and the at least one image sensor is in optical communication with a first end of the second light guide, and wherein a second end of the first light guide is configured for optical communication with the nose of the user, and a second end of the second light guide is configured for optical communication with the nose of the user.

Aspect 10: The head mounted device of any of aspects 4-9, wherein the at least one image sensor is positioned at a nose-facing side of the bridge portion.

Aspect 11: The head mounted device of any of aspects 1-10, wherein the at least one light emitter comprises a light emitting diode configured to output red light or near infrared light.

Aspect 12: The head mounted device of any of aspects 1-11, further comprising: one or more processors configured to determine, based at least in part on the image captured by the image sensor, the shift or the rotation of the head mounted device relative to the user.

Aspect 13: A system, comprising: a light emitter configured to emit light for illuminating at least a portion of a nose of a user wearing a head mounted device; an image sensor configured to capture an image of at least a portion of the nose of the user; a memory; and one or more processors coupled to the memory, the memory and the one or more processors configured to: determine a shift or a rotation of the head mounted device relative to the user based at least in part on the image.

Aspect 14: The system of aspect 13, wherein the light emitter and the image sensor are positioned at a bridge portion of the head mounted device that is positioned between a first eye portion of the head mounted device and a second eye portion of the head mounted device.

Aspect 15: The system of any of aspects 13-14, further comprising: at least one light guide configured to provide optical communication between the nose of the user and at least one of the light emitter or the image sensor.

Aspect 16: The system of aspect 15, wherein the at least one light guide includes a beveled end.

Aspect 17: The system of any of aspects 15-16, wherein the at least one light guide is configured to direct light from the light emitter to the nose of the user, collect light reflected from the nose of the user, and direct the reflected light to the image sensor.

Aspect 18: The system of any of aspects 15-16, wherein the at least one light guide is configured to direct light from the light emitter to the nose of the user, and wherein the image sensor is configured to directly detect light reflected from the nose of the user.

Aspect 19: The system of any of aspects 13-18, wherein the memory and the one or more processors are further configured to: adjust a calibration used for eye tracking of the user based at least in part on the shift or the rotation of the head mounted device.

Aspect 20: A method, comprising: obtaining, from an image sensor of a head mounted device, a first image of at least a portion of a nose of a user wearing the head mounted device; obtaining, from the image sensor of the head mounted device, a second image of at least a portion of the nose of the user; determining, based at least in part on the first image and the second image, a shift or a rotation of the head mounted device relative to the user; and adjusting a calibration used for eye tracking of the user based at least in part on the shift or the rotation of the head mounted device.

Aspect 21: The method of aspect 20, wherein determining the shift or the rotation of the head mounted device comprises: determining a shift of one or more pixels in the second image relative to the first image.

Aspect 22: The method of aspect 21, wherein the one or more pixels depict at least one of dermal features of the nose or subdermal features of the nose.

Aspect 23: The method of any of aspects 20-22, further comprising: performing eye tracking of the user based at least in part on the adjusted calibration; and adjusting a content of a display of the head mounted device based at least in part on performing eye tracking.

Aspect 24: The method of any of aspects 20-23, wherein the first image and the second image are obtained by the image sensor based at least in part on an illumination of at least a portion of the nose of the user by a light emitter.

Aspect 25: The method of any of aspects 20-24, wherein the shift or the rotation of the head mounted device is relative to the nose of the user, an eye of the user, or a head of the user.

Aspect 26: A non-transitory computer-readable medium storing a set of instructions, the set of instructions comprising: one or more instructions that, when executed by one or more processors of a head mounted device, cause the head mounted device to: monitor, using an image sensor, at least a portion of a nose of a user wearing the head mounted device; determine, based at least in part on monitoring the nose of the user, a shift or a rotation of the head mounted device relative to the user; and adjust a calibration used for eye tracking of the user based at least in part on the shift or the rotation of the head mounted device.

Aspect 27: The non-transitory computer-readable medium of aspect 26, wherein the one or more instructions, when executed by the one or more processors of the head mounted device, further cause the head mounted device to: output light, from a light emitter, toward the nose of the user.

Aspect 28: The non-transitory computer-readable medium of any of aspects 26-27, wherein the one or more instructions, that cause the head mounted device to monitor the nose of the user, cause the head mounted device to: obtain images of at least a portion of the nose of the user using the image sensor.

Aspect 29: The non-transitory computer-readable medium of any of aspects 26-28, wherein the one or more instructions, that cause the head mounted device to determine the shift or the rotation of the head mounted device, cause the head mounted device to: determine a shift of one or more pixels in images of at least a portion of the nose of the user obtained by the image sensor.

Aspect 30: The non-transitory computer-readable medium of any of aspects 26-29, wherein the one or more instructions, when executed by the one or more processors of the head mounted device, further cause the head mounted device to: perform eye tracking of the user based at least in part on the adjusted calibration.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A head mounted device, comprising:
   a first eye portion configured to face a first eye of a user wearing the head mounted device,
      wherein the first eye portion includes a display;
   a second eye portion configured to face a second eye of the user;
   at least one light emitter configured to emit light for illuminating at least a portion of a nose of the user;
   a bridge portion that is:
      between the first eye portion and the second eye portion, and
      above a bottom of the first eye portion and above a bottom of the second eye portion;
   at least one image sensor positioned:
      at a nose-facing side of the bridge portion, and
      closer to the second eye portion than the first eye portions; and
   one or more light guides that:
      one or more of extend along a nose-facing side of the bridge portion, extend parallel to or follow a path of the bridge portion, or are embedded within the bridge portion, and
      are between the first eye portion and the at least one image sensor,
         wherein the at least one image sensor is configured to capture an image of at least the portion of the nose of the user for use in determining a shift or a rotation of the head mounted device relative to the nose of the user.

2. The head mounted device of claim 1, wherein the one or more light guides include:
   a light guide optically coupled to the at least one light emitter and configured to direct light from the at least one light emitter, at a position away from the portion of the nose, to the portion of the nose.

3. The head mounted device of claim 1, wherein the one or more light guides include:
   a light guide optically coupled to the at least one image sensor and configured to direct light from the portion of the nose to the at least one image sensor at a position away from the portion of the nose.

4. The head mounted device of claim 1, wherein the at least one light emitter and the at least one image sensor are in optical communication with a first end of a light guide of the one or more light guides, and wherein a second end of the light guide is configured for optical communication with the nose of the user.

5. The head mounted device of claim 1, wherein the at least one light emitter is in optical communication with a first end of a light guide of the one or more light guides, wherein a second end of the light guide is configured for optical communication with the nose of the user, and wherein the at least one image sensor is configured for direct optical communication with the nose of the user.

6. The head mounted device of claim 1, wherein the one or more light guides include:

a first light guide at the bridge portion; and a second light guide at the bridge portion.

7. The head mounted device of claim 6, wherein the at least one light emitter is in optical communication with a first end of the first light guide, and the at least one image sensor is in optical communication with a first end of the second light guide, and wherein a second end of the first light guide is configured for optical communication with the nose of the user, and a second end of the second light guide is configured for optical communication with the nose of the user.

8. The head mounted device of claim 1, wherein the at least one light emitter comprises a light emitting diode configured to output red light or near infrared light.

9. The head mounted device of claim 1, further comprising:

one or more processors configured to determine, based at least in part on the image captured by the image sensor, the shift or the rotation of the head mounted device relative to the nose of the user.

10. A system, comprising:

a light emitter configured to emit light for illuminating at least a portion of a nose of a user wearing a head mounted device;

an image sensor positioned at a bottom side of a bridge portion of the head mounted device and configured to capture an image of at least the portion of the nose of the user, the bridge portion being between:

a first eye portion, of the head mounted device, configured to face a first eye of the user, and a second eye portion, of the head mounted device, configured to face a second eye of the user, the bridge portion being above a bottom of the first eye portion and above a bottom of the second eye portion, and the image sensor being further positioned closer to the second eye portion than the first eye portion;

one or more light guides that:

one or more of extend along the bridge portion, extend parallel to or follow a path of the bridge portion, or are embedded within the bridge portion, and are between the first eye portion and the image sensor; and one or more processors configured to:

determine a shift or a rotation of the head mounted device relative to the nose of the user based at least in part on the image.

11. The system of claim 10, wherein the one or more light guides include:

at least one light guide configured to provide optical communication between the nose of the user and at least one of the light emitter or the image sensor.

12. The system of claim 10, wherein the one or more light guides include at least one light guide that includes a beveled end.

13. The system of claim 10, wherein the one or more light guides include:

at least one light guide configured to direct light from the light emitter to the nose of the user, collect light reflected from the nose of the user, and direct the reflected light to the image sensor.

14. The system of claim 10, wherein the one or more light guides include:

at least one light guide configured to direct light from the light emitter to the nose of the user, and wherein the image sensor is configured to directly detect light reflected from the nose of the user.

15. The system of claim 10, wherein the one or more processors are further configured to:

adjust a calibration used for eye tracking of the user based at least in part on the shift or the rotation of the head mounted device.

16. A method, comprising:

obtaining, from an image sensor that is positioned at a bottom side of a bridge portion of a head mounted device, a first image of at least a portion of a nose of a user wearing the head mounted device, the bridge portion being between:

a first eye portion, of the head mounted device, configured to face a first eye of the user, and a second eye portion, of the head mounted device, configured to face a second eye of the user, the bridge portion being above one or more light guides, the one or more light guides being:

above a bottom of the first eye portion, above a bottom of the second eye portion, and between the first eye portion and the image sensor, and the image sensor being further positioned closer to the second eye portion than the first eye portion;

obtaining, from the image sensor, a second image of at least the portion of the nose of the user;

determining, based at least in part on the first image and the second image, a shift or a rotation of the head mounted device relative to the nose of the user; and adjusting a calibration used for eye tracking of the user based at least in part on the shift or the rotation of the head mounted device.

17. The method of claim 16, wherein determining the shift or the rotation of the head mounted device comprises:

determining a shift of one or more pixels in the second image relative to the first image.

18. The method of claim 17, wherein the one or more pixels depict at least one of dermal features of the nose or subdermal features of the nose.

19. The method of claim 16, further comprising:

performing eye tracking of the user based at least in part on the adjusted calibration; and adjusting a content of a display of the head mounted device based at least in part on performing eye tracking.

20. The method of claim 16, wherein the first image and the second image are obtained by the image sensor based at least in part on an illumination of at least the portion of the nose of the user by a light emitter.

21. A non-transitory computer-readable medium storing a set of instructions, the set of instructions comprising:

one or more instructions that, when executed by one or more processors of a head mounted device, cause the head mounted device to:
  monitor, using an image sensor that is positioned at a bottom side of a bridge portion of the head mounted device, at least a portion of a nose of a user wearing the head mounted device,
    the bridge portion being between:
      a first eye portion, of the head mounted device, configured to face a first eye of the user, and
      a second eye portion, of the head mounted device, configured to face a second eye of the user,
    the bridge portion being above one or more light guides,
    the one or more light guides being:
      above a bottom of the first eye portion,
      above a bottom of the second eye portion, and
      between the first eye portion and the image sensor, and
    the image sensor being further positioned closer to the second eye portion than the first eye portion;
  determine, based at least in part on monitoring the nose of the user, a shift or a rotation of the head mounted device relative to the nose of the user; and
  adjust a calibration used for eye tracking of the user based at least in part on the shift or the rotation of the head mounted device.

22. The non-transitory computer-readable medium of claim 21, wherein the one or more instructions, when executed by the one or more processors of the head mounted device, further cause the head mounted device to:
  output light, from a light emitter, toward the nose of the user.

23. The non-transitory computer-readable medium of claim 21, wherein the one or more instructions, that cause the head mounted device to monitor the nose of the user, cause the head mounted device to:
  obtain images of at least the portion of the nose of the user using the image sensor.

24. The non-transitory computer-readable medium of claim 21, wherein the one or more instructions, that cause the head mounted device to determine the shift or the rotation of the head mounted device, cause the head mounted device to:
  determine a shift of one or more pixels in images of at least the portion of the nose of the user obtained by the image sensor.

25. The non-transitory computer-readable medium of claim 21, wherein the one or more instructions, when executed by the one or more processors of the head mounted device, further cause the head mounted device to:
  perform eye tracking of the user based at least in part on the adjusted calibration.

26. The head mounted device of claim 1, further comprising:
  one or more processors configured to determine the shift or the rotation of the head mounted device relative to the nose of the user by tracking a shift of one or more nasal features in the image.

27. The head mounted device of claim 1, wherein the at least one light emitter is positioned at the nose-facing side of the bridge portion.

28. The head mounted device of claim 1,
  wherein the one or more light guides extend in a direction from the first eye portion to the second eye portion,
  wherein the one or more light guides are adjacent to the at least one light emitter and the at least one image sensor, and
  wherein one or more of the at least one light emitter or the at least one image sensor is between the light guide and the second eye portion.

29. The head mounted device of claim 1,
  wherein the one or more light guides are adjacent to the at least one light emitter and the at least one image sensor,
  wherein the at least one light emitter and the at least one image sensor are between the one or more light guides and the second eye portion.

30. The head mounted device of claim 1, wherein the first eye portion and the second eye portion extend below a bottom of the at least one image sensor and a bottom of the one or more light guides.

* * * * *